United States Patent

Haruguchi et al.

[11] Patent Number: 5,946,146
[45] Date of Patent: Aug. 31, 1999

[54] OPTICAL PICKUP AND SUPPORTING METHOD THEREOF

[75] Inventors: Takashi Haruguchi, Fukuoka; Munenori Aoyagi, Kumamoto; Yoshinobu Soeda, Onojo, all of Japan

[73] Assignee: Matsushita Electric Industrial Co., Ltd., Osaka, Japan

[21] Appl. No.: 09/131,165

[22] Filed: Aug. 7, 1998

Related U.S. Application Data

[62] Division of application No. 08/741,687, Oct. 31, 1996.

[30] Foreign Application Priority Data

Nov. 6, 1995 [JP] Japan .................................. 7-286938

[51] Int. Cl.⁶ .................................. G02B 7/02; G11B 7/00
[52] U.S. Cl. .................................. 359/824; 359/900; 369/44.15
[58] Field of Search .................................. 359/823, 824, 359/900; 369/44.15, 44.16

[56] References Cited

U.S. PATENT DOCUMENTS

| | | | |
|---|---|---|---|
| 4,616,355 | 10/1986 | Kashara | 369/44.16 |
| 4,661,943 | 4/1987 | Ikeda | 369/44.16 |
| 4,696,566 | 9/1987 | Sekimoto et al. | 359/824 |
| 4,991,161 | 2/1991 | Ikegame et al. | 369/44.15 |
| 5,124,965 | 6/1992 | Mizuno et al. | 369/44.22 |
| 5,218,483 | 6/1993 | Ikebe et al. | 359/813 |
| 5,561,648 | 10/1996 | Song | 369/44.15 |

FOREIGN PATENT DOCUMENTS

| | | |
|---|---|---|
| 0412556 | 2/1991 | European Pat. Off. . |
| 0441556A2 | 2/1991 | European Pat. Off. . |
| 0516390 | 12/1992 | European Pat. Off. . |
| 7105551 | 4/1995 | Japan . |
| 8180439 | 7/1996 | Japan . |

OTHER PUBLICATIONS

Japanese Utility Model Unexamined Publication No. 61-48424.
Japanese Utility Model Unexamined Publication No. 62-120425.

*Primary Examiner*—Georgia Epps
*Assistant Examiner*—Ricky Mack
*Attorney, Agent, or Firm*—Stevens, Davis, Miller & Mosher, L.L.P.

[57] ABSTRACT

An optical pickup for supporting lens holder tube for holding the objective lens converging a laser beam on an optical disc through linear elastic members supports the lens holder tube a plurality of linear elastic members bulged outwardly and arranged so that the bulged sections are opposite to each other around the objective lens.

5 Claims, 15 Drawing Sheets

OPTICAL PICKUP AND SUPPORTING METHOD THEREOF

This is a division of application Ser. No. 08/741,687 filed Oct. 31, 1996.

BACKGROUND OF THE INVENTION

1. Field of the Invention

The present invention relates to an optical pickup used for an optical video disc, compact disc and the like, a supporting method for it, and a method for assembling it.

2. Description of the Related Art

A conventional optical pickup is described hereinafter. FIG. 11 is a plan view of a conventional optical pickup; FIG. 12(a) is a sectional view of the optical pickup of FIG. 11 taken along line XII(a)—XII(a); and FIG. 12(b) is a sectional view of the optical pickup of FIG. 11 taken along line XII(b)—XII(b).

Referring to the figures, there is shown an objective lens holder tube 1 on which an objective lens 4 for focusing laser beam 3 onto an optical disc 2 is secured with adhesives or the like. In addition, secured on the objective lens holder tube 1 with adhesives or the like are a focusing coil 5 for operation in the focusing direction (direction perpendicular to the plane of the optical disc 2) and a tracking coil 6 for operation in the tracking direction (radial direction of the optical disc 2 indicated by an arrow T). There are also shown permanent magnets 7a and 7b for constituting a magnetic circuit which drives the objective lens holding tube 1 in the focusing and tracking directions. The magnets are magnetized to the N pole at the objective lens 4 side and to the S pole at the opposite side. The optical disc 2 is rotatably driven by a spindle motor or the like (not shown).

There is provided a conductive linear elastic member 8 for holding the objective lens holder tube 1 at the neutral position, and also supplying electric power to the focusing coil 5 and the tracking coil 6. This member is constituted by a non-magnetic material so that the magnets 7a and 7b do not exert magnetic attractive force. A junction board 9 secured at each end of the objective lens holder tube 1 with means such as adhesives is a junction board for supplying electric power to the focusing coil 5 and the tracking coil 6 from the linear elastic members 8, one end of which is soldered so that respective patterns on the junction board 9 conducts to individual linear elastic members 8.

A suspension holder 10 is secured at one end with an FPC (not shown) for supplying electric power with adhesives or the like, and at one end reverse to the objective lens 4 with the linear elastic members 8 by soldering. In addition, the suspension holder 10 is secured on a carriage 11 movable from an inner periphery to an outer periphery of the optical disc 2. A damping member 12 is used for suppressing Q value of the primary resonance which a system constituted by an optical moving section (actuator) including the objective lens holder tube 1 and the linear elastic members 8 has. A material with low viscosity such as silicon gel is used for the damping member 12.

The optical pickup arranged as above is described for its operation. First, electric power is supplied from a power supply to the focus coil 5 and the tracking coil 6 through the FPC (not shown), the linear elastic members 8, and the junction board 9. Currents flowing through the focusing coil 5 and the tracking coil 6 exert electromagnetic forces on the focusing coil 5 and the tracking coil 6 according to the Fleming's left hand rule under the influence of the magnetic fields generated by the permanent magnets 7a and 7b so that the movable section (actuator) of the optical pickup including the objective lens holder tube 1 can be driven. The direction and magnitude of the current flowing through each coil are controlled to adjust the position of the objective lens 4, whereby an optical spot which is a converged laser beam 3 is controlled to be constantly focused on the optical disk 2 and to follow a track of optical pits (fine tracking). In addition, when supply of the electrical power is stopped, the objective lens is always returned to the neutral position in the focusing and tracking directions by the spring force of the linear elastic members 8.

An optical unit 13 has a light emitting element and a light receiving element for the laser beam 3. The laser beam 3 emitted from an optical unit 13 passes through an optical component 13a constituting a hologram, is totally reflected on the surface of a multi-layer coated riser mirror 14, converged by the objective lens 4, and images an optical spot on the optical disc 2. Oppositely, the laser beam 3 reflected from the optical disc 2 is totally reflected on the riser mirror 14, passes through the optical component 13a constituting a hologram, and is collected on the light receiving element (not shown). The objective lens 4 is focused on the optical disc 2, and controlled to follow the track of the optical pits based on a received light signal converted into an electrical signal by the light receiving element (not shown).

Now, a method for assembling the optical pickup as described above is described. FIGS. 13(a) and 13(b) are views illustrating the step of connecting the junction board 9 and the linear elastic members 8; FIGS. 14(a) and 14(b) are views illustrating the step of combining the suspension holder 10 and the linear elastic members 8; and FIGS. 15(a) and 15(b) are views illustrating the step of completing the connection of the linear elastic members.

First, referring to FIGS. 13(a) and 13(b), the movable section (actuator) including the objective lens holder tube 1 is mounted on a jig 15. Then, the suspension holder 10 on which the FPC (not shown) for supplying electric power is bonded with means such as adhesives is mounted on a jig 16. Furthermore, the linear elastic members 8 are mounted on a jig 17 with means such as air suction so that four linear elastic members 8 are parallel to each other.

In this initial stage, the jig 16 is retracted in the direction of W to a position where the suspension holder 8 does not come into contact with the linear elastic members 8 and the jig 17 is moved toward the movable section (actuator) including the objective lens holder tube 1 to a predetermined position. In this state, the linear elastic members 8 are secured on portions of the junction board 9 at the movable section (actuator) side at four positions with solder.

Then, holding of the linear elastic members 8 is released from the jig 17. In this state, the linear elastic members 8 are secured on the junction board 9 of the movable section (actuator), so that they would not drop.

Then, referring to FIGS. 14(a) and 14(b), the jig 16 is moved in the direction of W, and set at a predetermined position. In this case, the tips of the linear elastic members 8 pass through small holes 10a drilled through the suspension holder 10.

Then, referring to FIGS. 15(a) and 15(b), the optical pickup is assembled by soldering the linear elastic members 8 passed through the small holes 10a in the suspension holder 10, and filling conical spaces with dumping members 12. FIG. 11 shows a state where the optical pickup thus assembled is mounted on the carriage 11. In the figure, four parallel linear elastic members 8 support between the junction board 9 and the suspension holder 10.

In the optical disc device using the conventional optical pickup as described above, an optical pickup which can be easily and precisely assembled and does not cause vibration is demanded as the optical disc device is enhanced for its performance, improved for its access speed, and reduced for its size (thinned).

However, in the optical pickup with the above arrangement, the position of the objective lens 4 (substantially the center of gravity of the entire drive section) is spaced away from the drive point (the focusing coil 5 and the tracking coil 6). Thus, there tends to arise vibration in pitching mode (plane vibration, secondary resonance of the focus system) or yawing mode (eccentricity, secondary resonance of the tracking system) of the linear elastic member 8. Therefore, since it is necessary to match the position of center of gravity of the movable section including the objective lens holder tube 1 and the position of the drive point in the order of several $\mu$m to suppress the vibration, it is necessary to conduct the production in a very severe tolerance.

In addition, since variation of the center of gravity in manufacturing induces vibration of the linear elastic member 8 in the pitching or yawing mode, impediment on control may arise when the phase of vibration occurs.

To solve the above problems, there has been proposed a wire suspension structure movable in the tracking, focusing and tangential direction (Japanese Utility Model Unexamined Publication No. 61-48424) and a structure for dampedly supporting wires (Japanese Utility Model Unexamined Publication No. 62-120425). However, any of them cannot suppress the secondary resonance of the focusing and tracking systems.

The present invention is intended to solve the above conventional problems, and to provide an optical pickup not causing vibration, a method for supporting the optical pickup, and a method for assembling the optical pickup.

SUMMARY OF THE INVENTION

The present invention is an optical pickup for supporting lens holding means for holding the objective lens through linear elastic members, and a method for supporting the optical pickup. The lens holding means is supported by bowing a plurality of linear elastic members so that bowed and bulged portions are arranged to be bulged outward from each other around the objective lens.

According to the optical pickup of the present invention, the linear elastic members bulged outward from each other are oppositely bowed which respect to each other so that they offset distortion stress. Thus, the objective lens (entire movable section) and the linear elastic members do not generate resonance during fine tracking movement.

The optical pickup arranged as above is assembled by an assembly method comprising the steps of securing ends of the linear elastic members (of free lines) which do not impose distortion stress on the lens holding means, passing the other ends of the linear elastic members through respective small holes drilled through the support means, and bowing the linear elastic members and securing the other ends of the linear elastic members on the support means with an angle corresponding to the bowing. With such assembling process, the bowed linear elastic members can be easily assembled.

BRIEF DESCRIPTION OF THE DRAWINGS

FIG. 2(*b*) is a sectional view of the optical pickup of FIG. 1 taken along line II(*b*)—II(*b*);

FIG. 3(*b*) is a side view of FIG. 3(*a*);

FIG. 4(*b*) is a side view of FIG. 4(*a*);

FIG. 5(*b*) is a side view of FIG. 5(*a*);

FIG. 6(*b*) is a side view of FIG. 6(*a*);

FIG. 7(*b*) is a side view of FIG. 7(*a*);

FIG. 8(*b*) is a side view of FIG. 8(*a*);

FIG. 10(*b*) is a side view of FIG. 10(*a*);

FIG. 12(*b*) is a sectional view of the optical pickup of FIG. 11 taken along line XII(*b*)—XII(*b*);

FIG. 13(*b*) is a side view of FIG. 13(*a*);

FIG. 14(*b*) is a side view of FIG. 14(*a*);

FIG. 15(*b*) is a side view of FIG. 15(*a*).

DESCRIPTION OF THE PREFERRED EMBODIMENTS

Now, embodiments of the present invention are described with reference to the drawings.

Embodiment 1

Figure 1:
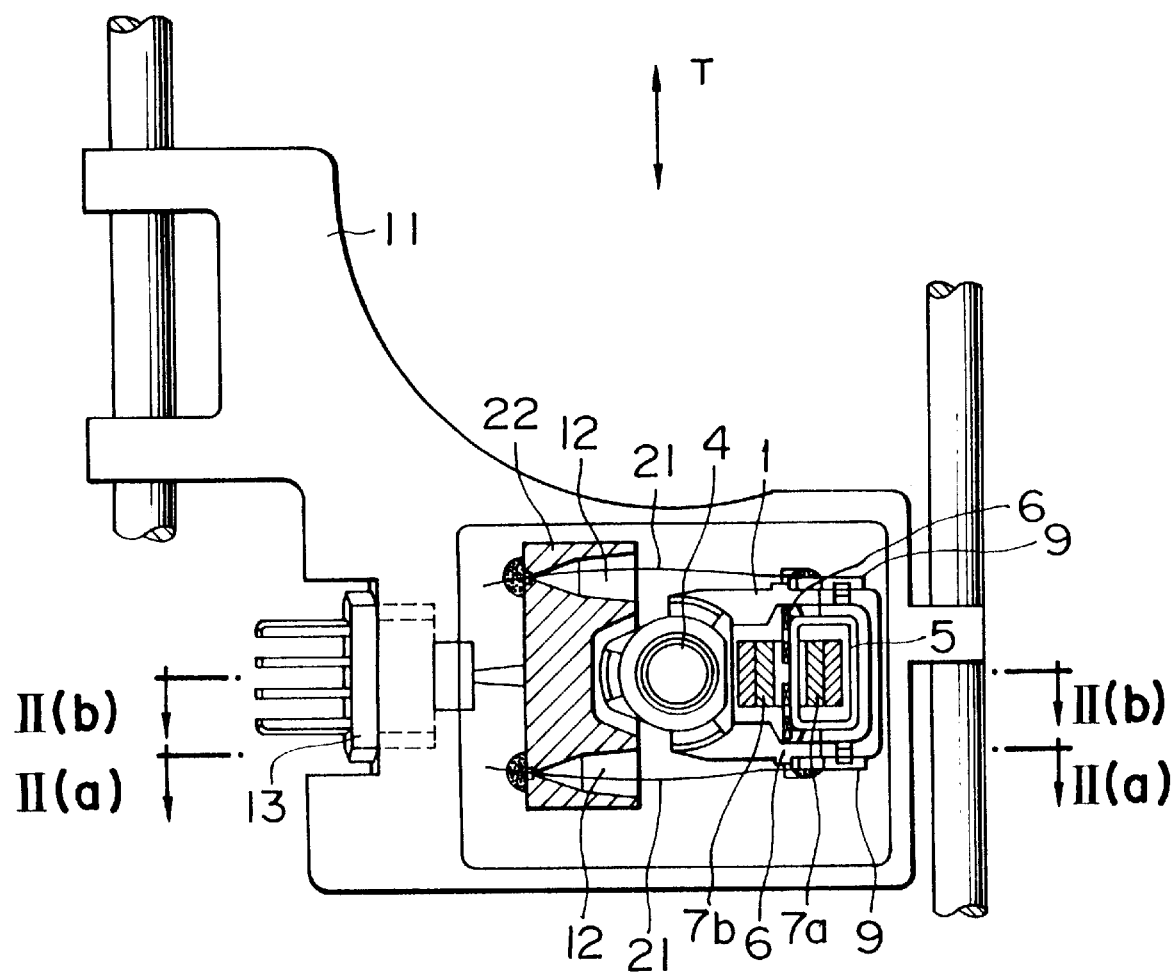
FIG. 1 is a plan view of an optical pickup according to the present invention.
Figure 2A:
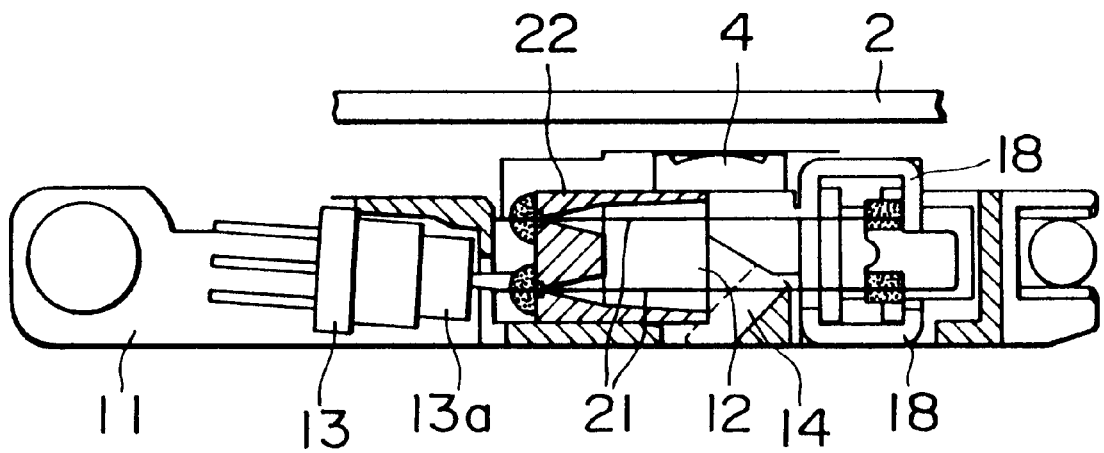
FIG. 2(*a*) is a sectional view of the optical pickup of FIG. 1 taken along line II(*a*)—II(*a*)
Figure 2B:
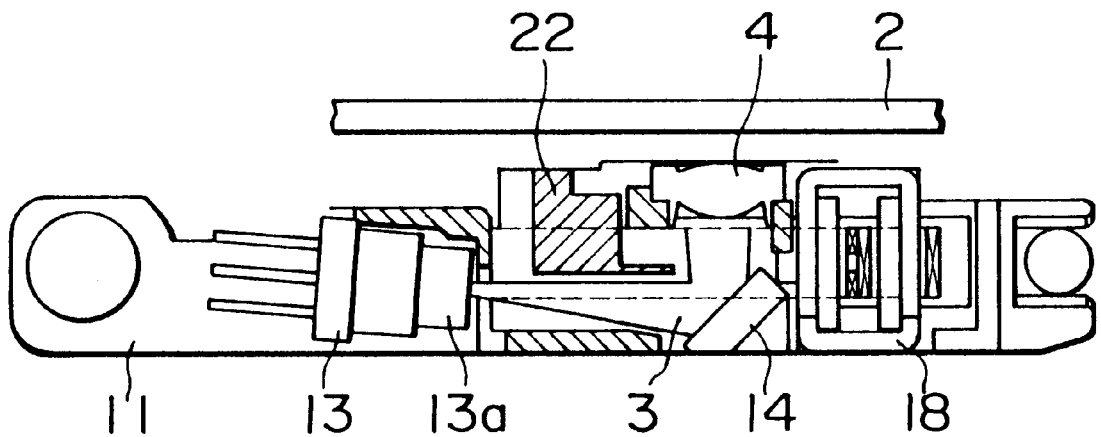

FIG. 1 is a plan view of an optical pickup according to the present invention; FIG. 2(*a*) is a sectional view of the optical pickup of FIG. 1 taken along line II(*a*)—II(*a*); and FIG. 2(*b*) is a sectional view of the optical pickup of FIG. 1 taken along line II(*b*)—II(*b*). The same components and members as in the conventional optical pickup are designated by like reference numerals and duplicated description is omitted.

Referring to FIGS. 1, 2(*a*) and (*b*), there are shown an objective lens holder tube 1, an optical disc 2, a laser beam 3, an objective lens 4, a focusing coil 5, a tracking coil 6, permanent magnets 7a and 7b, and a junction board 9.

Linear elastic members 21 are conductive linear elastic members serving to hold the objective lens holder tube 1 at the neutral position, and to supply electric power to the focusing coil 5 and the tracking coil 6. Non-magnetic material is used for them so that no magnetic attractive force by the permanent magnets 7a and 7b acts. In addition, as shown in FIG. 1, they are secured in a bowed state so that they surround the objective lens 4, and are bulged outward around the objective lens 4.

A suspension holder 22 has one end to which an FPC (not shown) for supplying electric power is secured with adhesives or the like, and the linear elastic members 21 are secured at a position reverse to the objective lens 4 with an angle corresponding to the bowing by soldering. Furthermore, the suspension holder 22 is secured on a carriage 11. A damping member 12 is of a material with low viscosity such as silicon gel. There are shown an optical unit 13, an optical component 13a, and a riser mirror 14.

The optical pickup arranged as above is described for its operation. First, electric power is supplied to the focusing coil 5 and the tracking coil 6 from a power supply through the FPC (not shown), the linear elastic members 21 and the junction board 9.

On the other hand, magnetic lines of force from the N pole of the permanent magnet 7a are directed to the S pole of the opposite permanent magnet 7b through the focusing coil 5 and the tracking coil 6, and from the opposite N pole to the S pole of the permanent magnet 7a through a magnetic yoke 18.

Currents flowing through the focusing coil 5 and the tracking coil 6 are subjected to a magnetic field (that is, magnetic lines of force) generated by the permanent magnets 7a and 7b, and electromagnetic forces act to the focusing coil 5 and the tracking coil 6 according to the Fleming's left hand rule, and the movable section (actuator) of the optical pickup including the objective lens holder tube 1 is driven. The focus of the objective lens 4 is controlled to be continuously focused on the disc 2 and to follow the optical pit track by controlling the direction and magnitude of current flowing through each of these coils to control the position of the objective lens 4. In addition, they are assembled in such a manner that, when the supply of electric power is stopped, the objective lens 4 is returned to a position where spring forces of the bowed linear elastic members 21 for restoring are balanced, which position is the neutral position of the actuator in the focusing and tracking directions.

Passages and operation of the optical system including the laser beam 3 are the same as those of the conventional optical pickup, and description on them is omitted to avoid duplication.

When the optical pickup arranged as above performs fine tracking operation associated with information search, each movable part of the actuator including the objective lens holder tube 1 is accelerated or decelerated in the tracking direction as in the prior art.

However, since the linear elastic members 21 are previously bowed to be bulged outward from each other around the objective lens 4, distortion stresses have existed therein. In addition, since these members are oppositely bowed by twos with respect to the tracking movement direction (T indicated by an arrow), the distortion stresses are offset. Therefore, eliminated is the "combined natural frequency" in the pitching or yawing mode which is generated when four straight linear elastic members 8 like cantilevers are combined as is in the conventional optical pickup, so that resonance between the moment of inertia of the mass of the entire actuator and the linear elastic members 21 cannot be caused.

Furthermore, for example, when the fine tracking movement is begun upward in FIG. 1, the tracking coil 6 and the objective lens holder tube 1 move upward, while the carriage 11 (and, therefore, the suspension holder 22 secured on the carriage 11) does not move, so that displacement of the members 21 is resulted. The displacement reduces the distortion stresses in the two linear elastic members 21 upper in FIG. 1, and increases it in the two linear elastic members 21 lower in FIG. 1, since the distortion stresses are offset by oppositely bowing two members each. Thus, the amount of combined distortion in upper and lower four linear elastic members would be the similar amount of stress to that when no bowing distortion is provided because of the offset effect. That is, flexibility of the upper and lower four linear elastic members to the displacement would be the same as when no bowing distortion is provided.

Then, according to the embodiment of the present invention, resonance is most effectively suppressed when a bowing ratio is in a range of $0.005 \leq$ bowing ratio$=d/L \leq 0.08$ where, in FIG. 5 described later, length of the linear elastic member 21 is L, and displacement by bowing from the state where no stress is applied on the linear elastic member 21 is d.

Embodiment 2

Figure 3A:
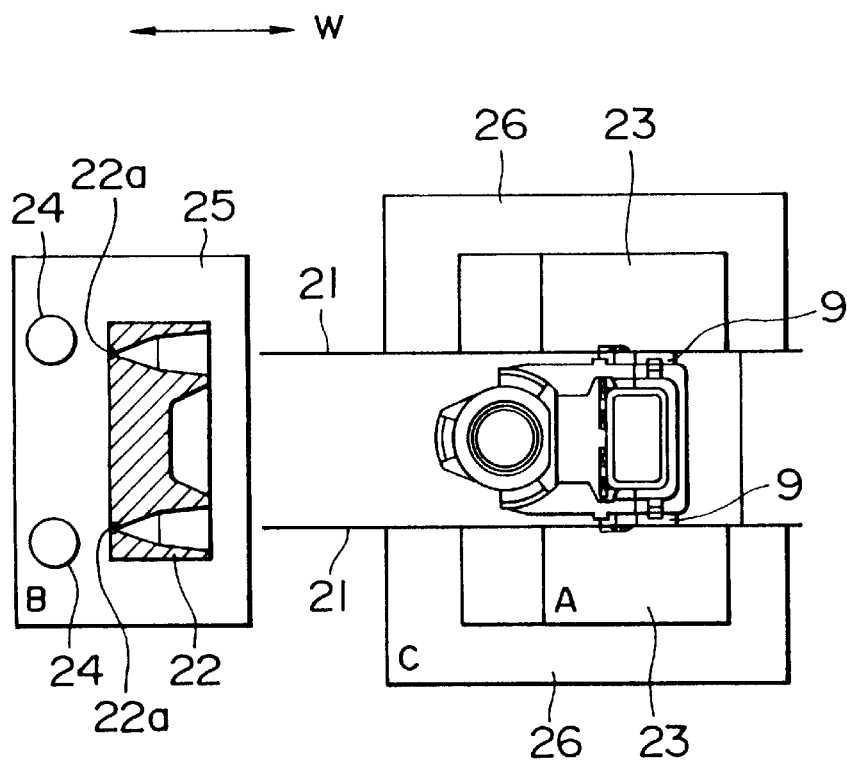
FIG. 3(*a*) is a plan view illustrating the step of connecting the junction board and the linear elastic members.
Figure 3B:
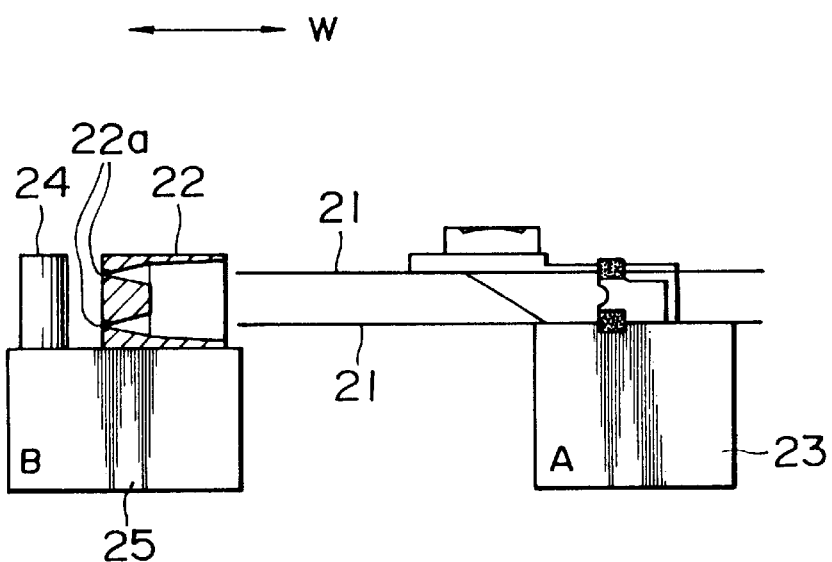
Figure 4A:
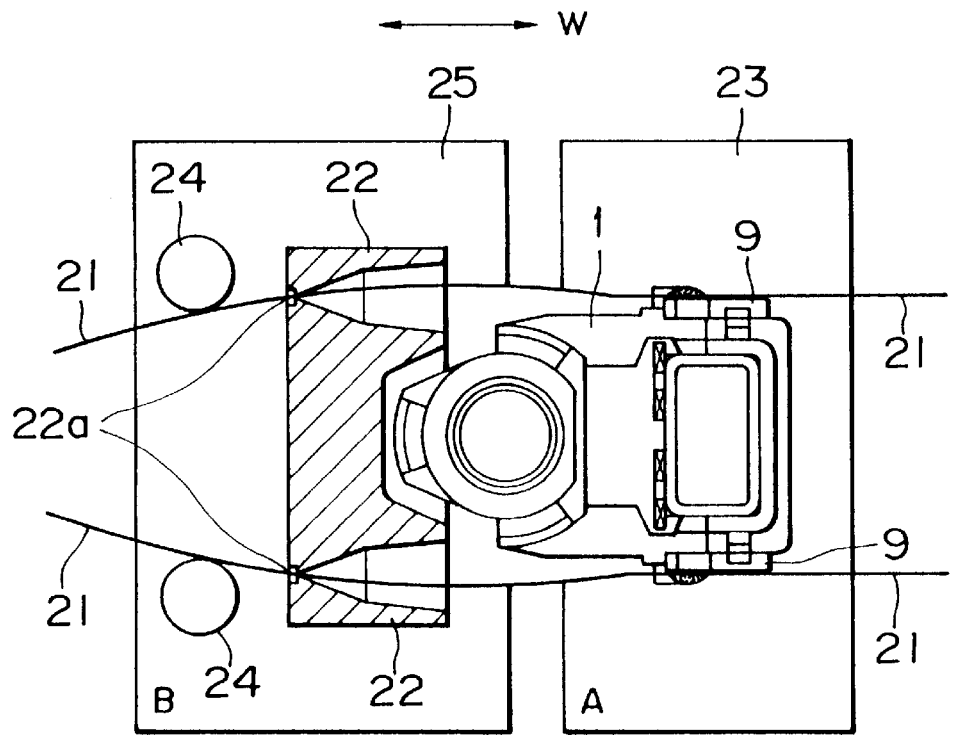
FIG. 4(*a*) is a plan view illustrating the step of combining the suspension holder and the linear elastic members.
Figure 4B:
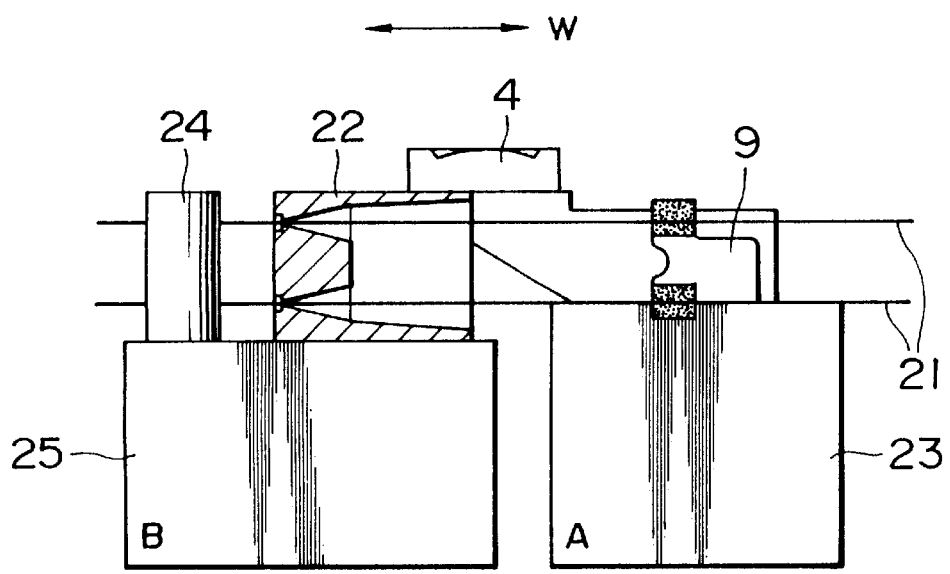
Figure 5A:
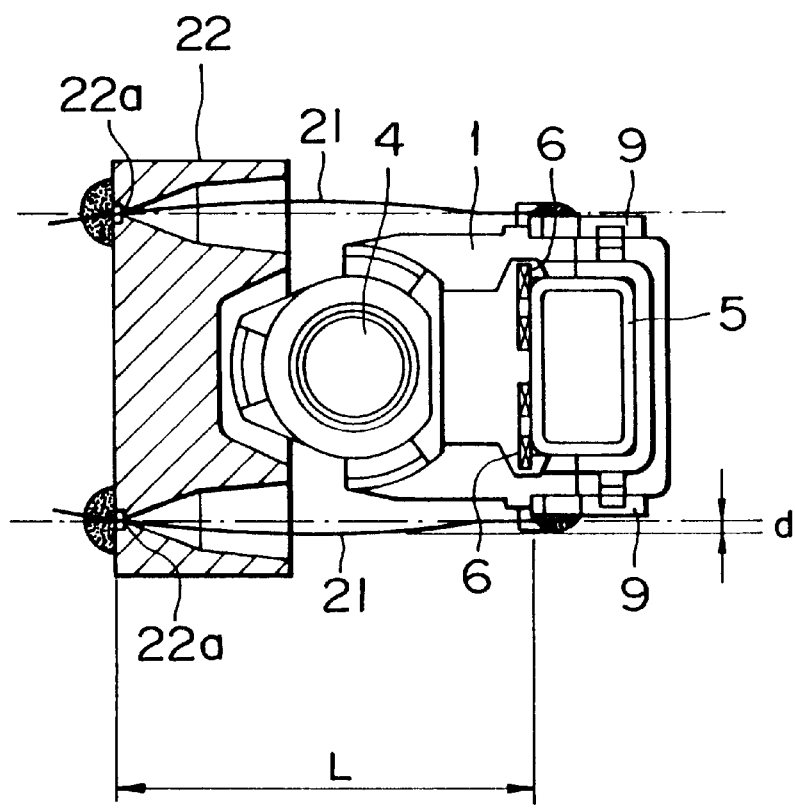
FIG. 5(*a*) is a plan view illustrating the step of completing the connection of the linear elastic members.
Figure 5B:
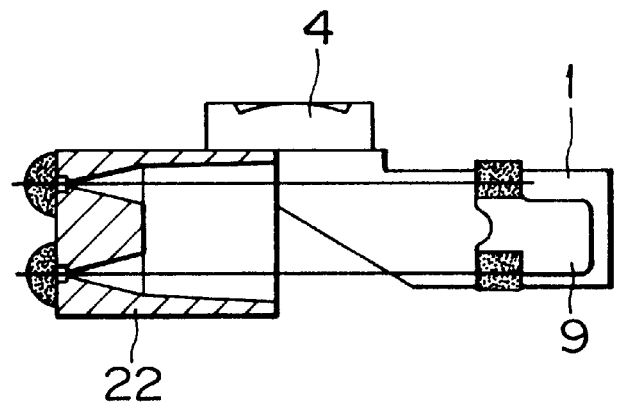

The method for assembling the optical pickup as described above is described for its embodiment by exemplifying a type supported by four elastic members 21 with reference to the drawings. FIG. 3(a) is a plan view illustrating the step of connecting the junction board 9 and the linear elastic members 24; FIG. 3(b) is a side view of FIG. 3(a); FIG. 4(a) is a plan view illustrating the step of combining the suspension holder 11 and the linear elastic members 21; FIG. 4(b) is a side view of FIG. 4(a); FIG. 5(a) is a plan view illustrating the step of completing the connection of the linear elastic members 21; and FIG. 5(b) is a side view of FIG. 5(a). The same components and members as in the conventional example and the first embodiment are designated by like reference numerals, and duplicated description is omitted.

First, in FIGS. 3(a) and 3(b), the movable section (actuator) including the objective lens holder tube 1 is mounted on the jig 23. The suspension holder 22 attached with the FPC (not shown) for power supply with adhesives or the like is mounted on the jig 25 on which bow stretch pins 24 are mounted. In addition, the linear elastic members 21 are mounted on the jig 26 by means of air suction so that four linear elastic members 21 are parallel to each other.

In this initial state, the jig 25 is retracted in the direction of W to a position where the suspension holder 22 does not come into contact with the linear elastic members 21 and the jig 26 is moved to a predetermined position toward the actuator including the objective lens holder tube 1. This is attained by slide movement with an XY stage (not shown) or rotation with the jig 26. Since such procedure is attained by the conventional movement mechanism, description is omitted.

In this initial state, the linear elastic members 21 are secured with soldering on the junction board 9 at four positions. Then, holding of the linear elastic members 21 on the jig 26 are released. That is, the linear elastic members 21 are secured at the junction board 9 with soldering in parallel to the direction of W in the figure.

Then, as shown in FIGS. 4(a) and 4(b), the jig 25 is set at a predetermined position by moving it in the W direction. At the moment, the tips of the linear elastic members 21 at the suspension holder side pass through small holes 22a formed in the suspension holder 22, slid over the surfaces of the bow stretch pins 24, and are naturally curved toward the center of the objective lens 4. This is because the centers of the bow stretch pins 24 are set on the jig 25 to be positioned outside the objective lens 4 with respect to the center axes of the linear elastic members 21.

The bow stretch pin 24 is arranged to be coated with a slidable material such as Teflon so that the linear elastic member 21 can smoothly slide over the bow stretch pin 24. The linear elastic member 21 is bowed by determining the position of the bow stretch pin 24 so that a desired curvature can be obtained from the positional relationship among the soldered position to the junction board 9 of the actuator, the small hole 22a and the bow stretch pin 24.

Then, as shown in FIGS. 5(a) and 5(b), the linear elastic members 21 are soldered to the suspension holder 22. Thus, the linear elastic members 21 at the suspension holder side are secured in a bowed state. Even if the linear elastic members 21 are released from the jigs 23 and 25 under such state, the bowed shapes of the linear elastic members 21 formed on the jigs would not be returned to the parallel state, and be maintained in the desired bowed state, and the neutral position of the objective lens 4 would not be also changed. It is because, as seen from FIGS. 4(a) and 5(a), the ends of the linear elastic members 21 at the suspension holder side are secured by soldering in a state inclined with an angle corresponding to the bowing with respect to the direction of W indicated by an arrow in the figures. Therefore, together with securing to the junction board 9, the internal stress causing one bowed linear elastic member 21 to extend and return to the straight state is offset by the internal stress in another bowed linear elastic member 21 opposite with respect to the objective lens 4.

In particular, according to the above method, the ratio of bowing can be accurately attained because one end is first secured in the state where no stress is applied, and then the other end is secured after the desired bowing is provided.

Embodiment 3

Figure 6A:
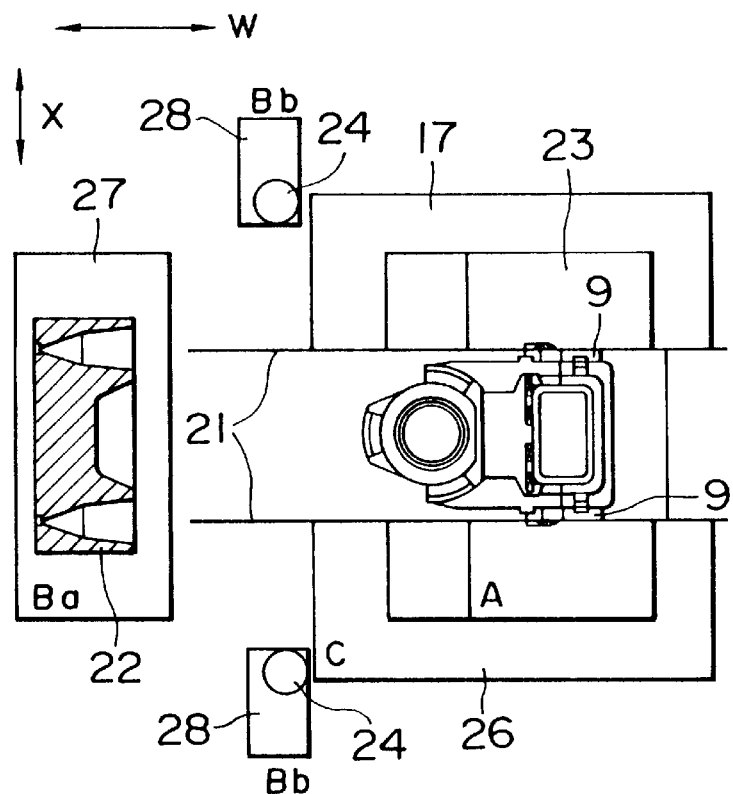
FIG. 6(*a*) is a plan view illustrating an assembly method in which the bowed stretch pins are mounted on a different jig.
Figure 6B:
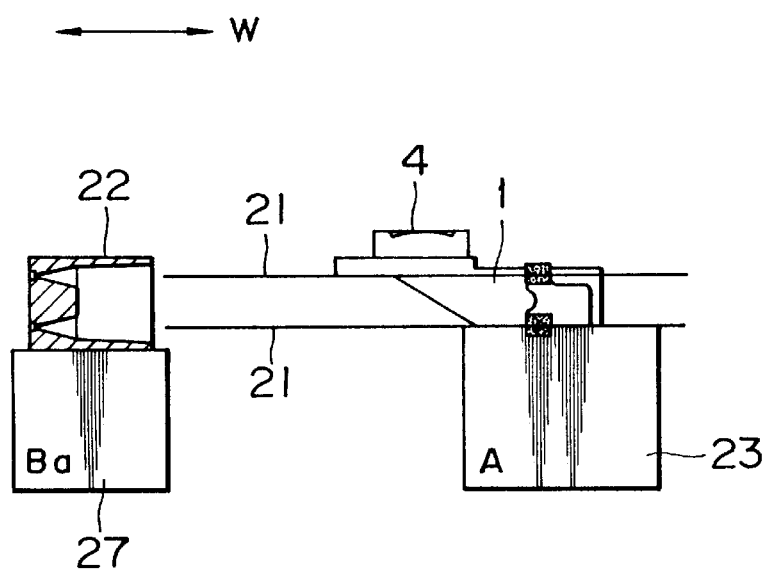
Figure 7A:
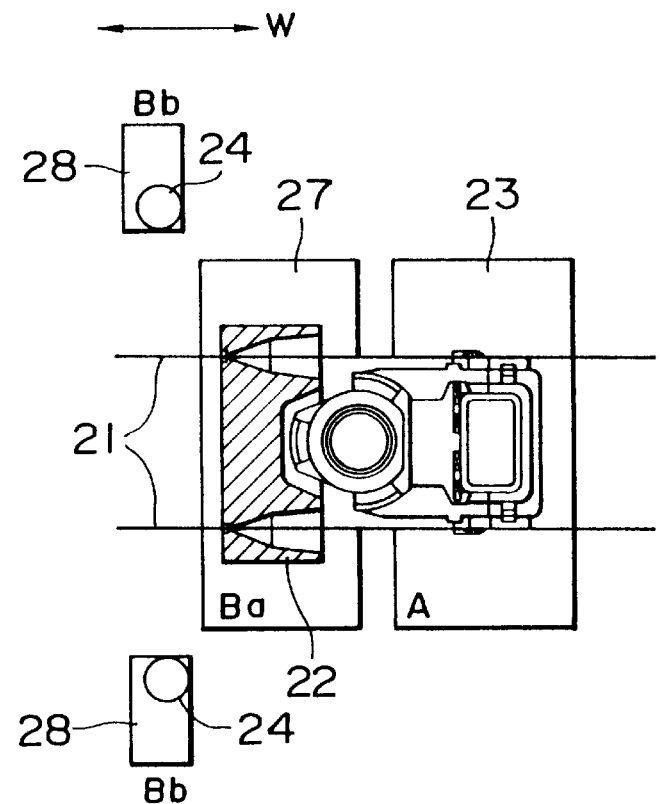
FIG. 7(*a*) is a plan view illustrating the step of connecting the junction board and the linear elastic members in the assembly method of FIGS. 6(*a*) and 6(*b*)
Figure 7B:
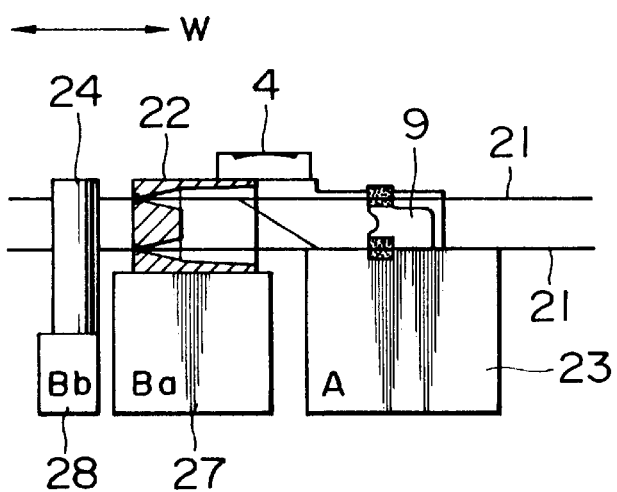
Figure 8A:
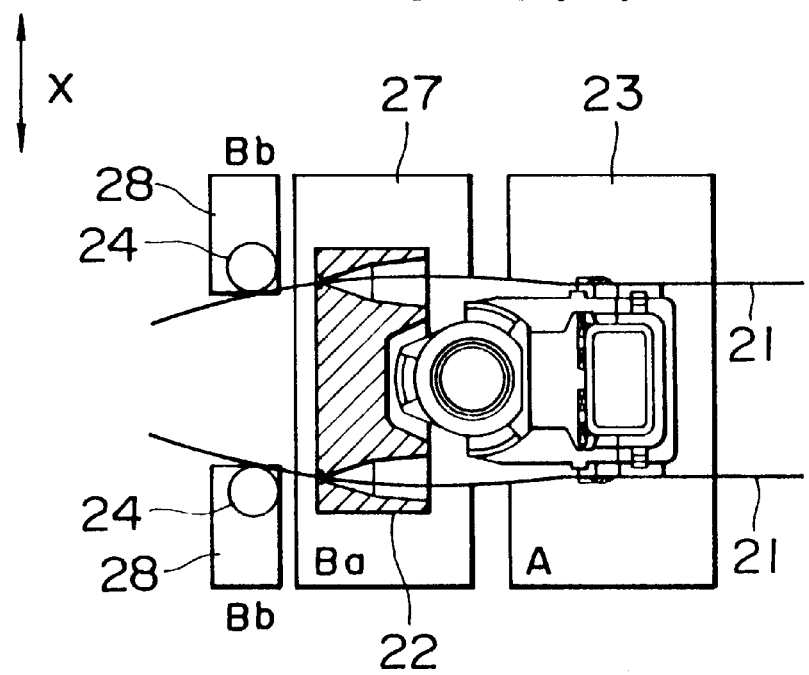
FIG. 8(*a*) is a plan view illustrating the step of combining the suspension holder and the linear elastic members in the assembly method of FIGS. 6(*a*) and 6(*b*)
Figure 8B:
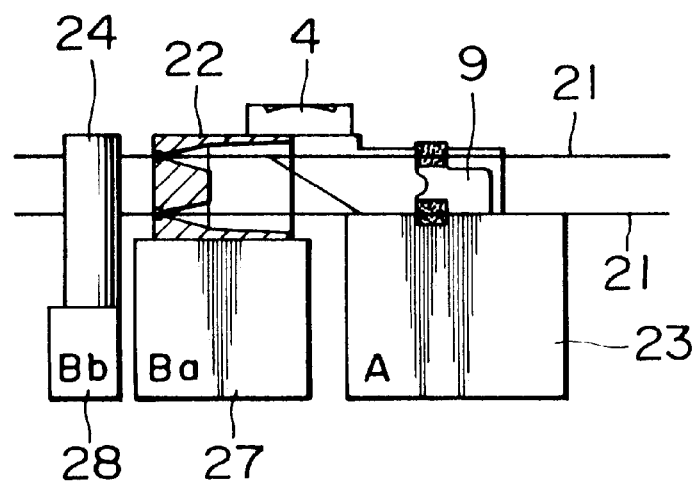

Now, a third embodiment is described for another assembly method of the optical pickup with reference to the drawings. FIG. 6(a) is a plan view illustrating an assembly method in which the bow stretch pins 24 are mounted on a different jig; FIG. 6(b) is a side view of FIG. 6(a); FIG. 7(a) is a plan view illustrating the step of connecting the junction board 9 and the linear elastic members 21 in the assembly method of FIGS. 6(a) and 6(b); FIG. 7(b) is a side view of FIG. 7(a); FIG. 8(a) is a plan view illustrating the step of combining the suspension holder 22 and the linear elastic members 21 in the assembly method of FIGS. 6(a) and 6(b); FIG. 8(b) is a side view of FIG. 8(a). The same components and members as in the conventional example and the first and second embodiments are designated by like reference numerals, and duplicated description is omitted.

As shown in FIGS. 6(a) and 6(b), the jig 25 shown in FIGS. 3(a) and 3(b) as above is divided into a jig 27 supporting the suspension holder 22 and movable in the W direction, and jigs 28 supporting the bow stretch pin 24 and movable in a direction (X) perpendicular to the linear elastic members 21. Both jigs are mounted on separate movement mechanisms. As the movement mechanism, a conventional XY stage or the like is used.

First, similar to the second embodiment, the assembly process comprises, as shown in FIG. 6, the steps of mounting the movable section (actuator) including the objective lens holder tube 1 on the jig 23, and mounting the suspension holder 22 attached with the FPC (not shown) for power supply with adhesives or the like on the jig 27. In addition, the linear elastic members 21 are mounted on the jig 26 by means of air suction so that four linear elastic members 21 are parallel to each other.

In the initial stage of assembly, the jig 27 is retracted in the direction of W to a position where the suspension holder 22 does not come into contact with the linear elastic members 21. In addition, the jigs 28 are also retracted in the direction of X to a position where they do not come into contact with the linear elastic members 21.

Then, the jig 26 is moved to a predetermined position toward the actuator, and the linear elastic members 21 are soldered on the junction board 9 at four positions.

Then, as shown in FIGS. 7(a) and 7(b), the jig 27 is moved in the W direction, and set at a predetermined position. At this time, the tips of the linear elastic members 21 at the suspension holder side pass through the small holes 22a formed in the suspension holder 22.

Then, as shown in FIG. 8, the jigs 28 on which the bow stretch pins 24 are vertically mounted are moved in the X direction to a predetermined position, whereby the curvature of the linear elastic members 21 is established. In addition, the ratio of bowing (d/L) can be adjusted by adjusting the movement distance of the jigs 28.

Embodiment 4

Figure 9:
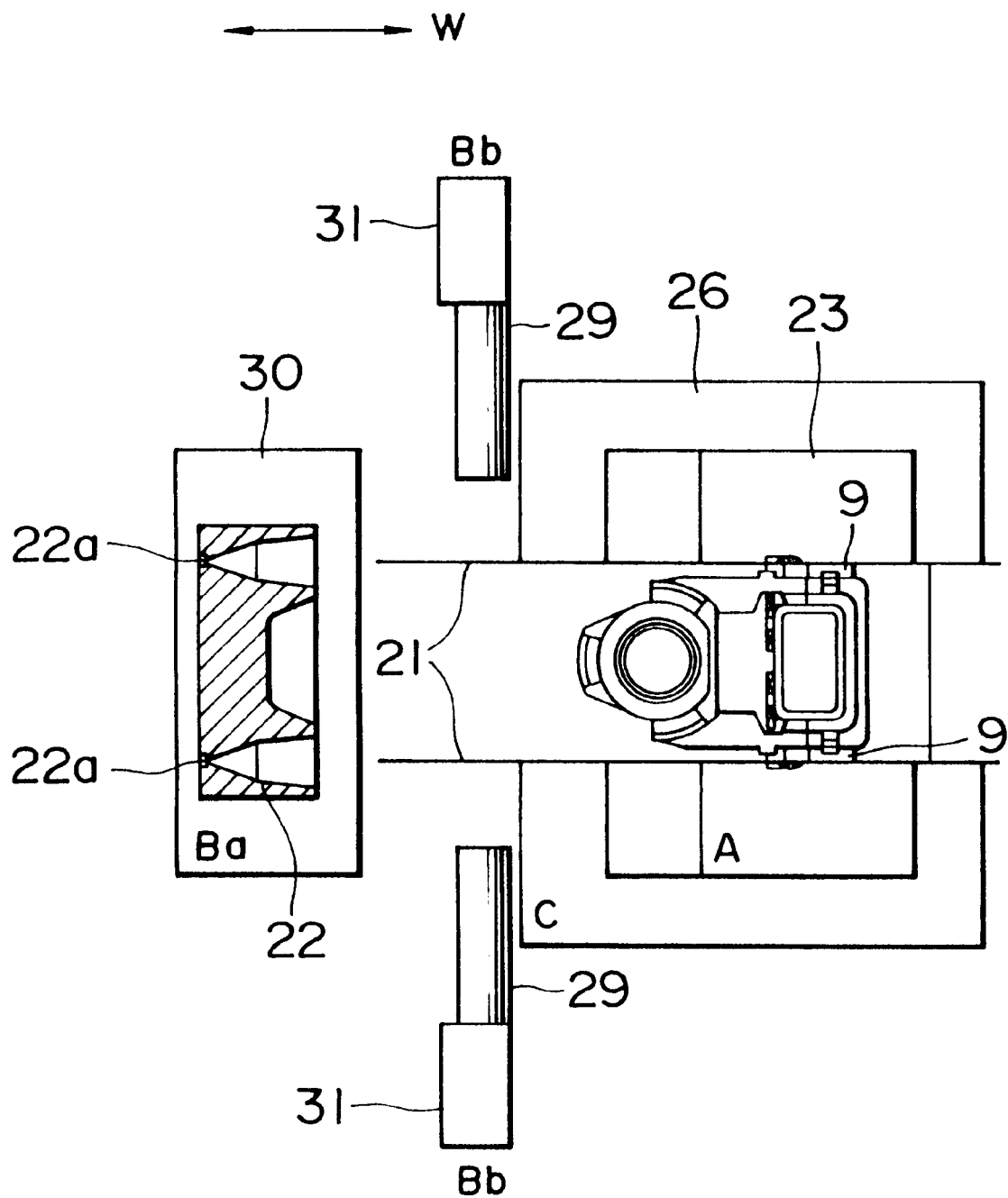
FIG. 9 is a plan view illustrating another assembly method in which the bowed stretch pins are mounted on a different jig.
Figure 10A:
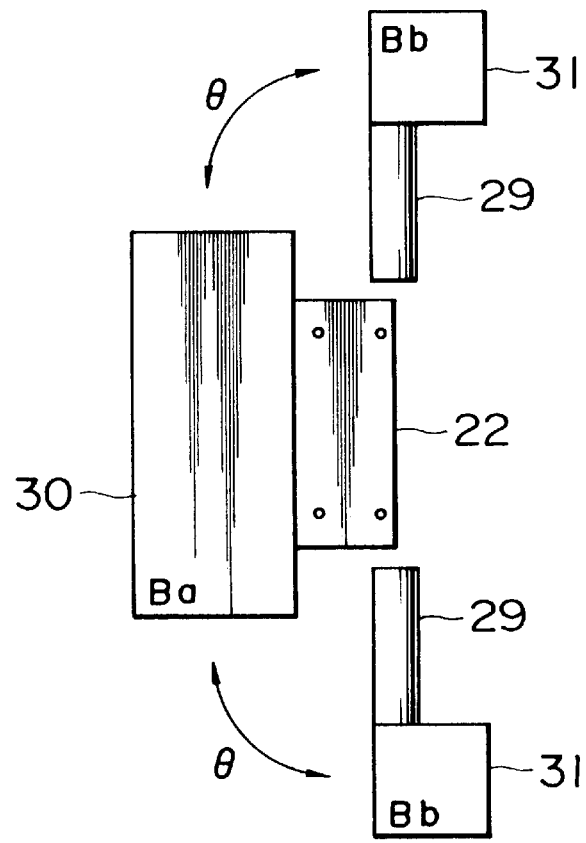
FIG. 10(*a*) is a front view illustrating the assembly method of FIG. 9.
Figure 10B:
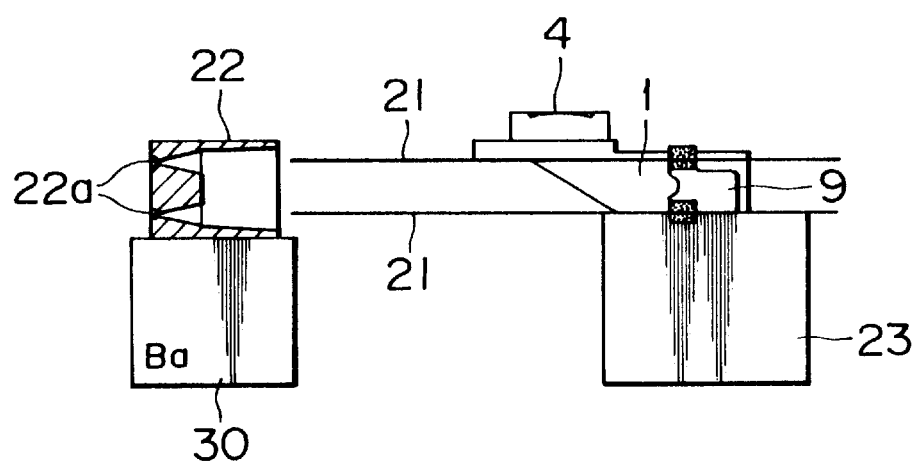
Figure 11:
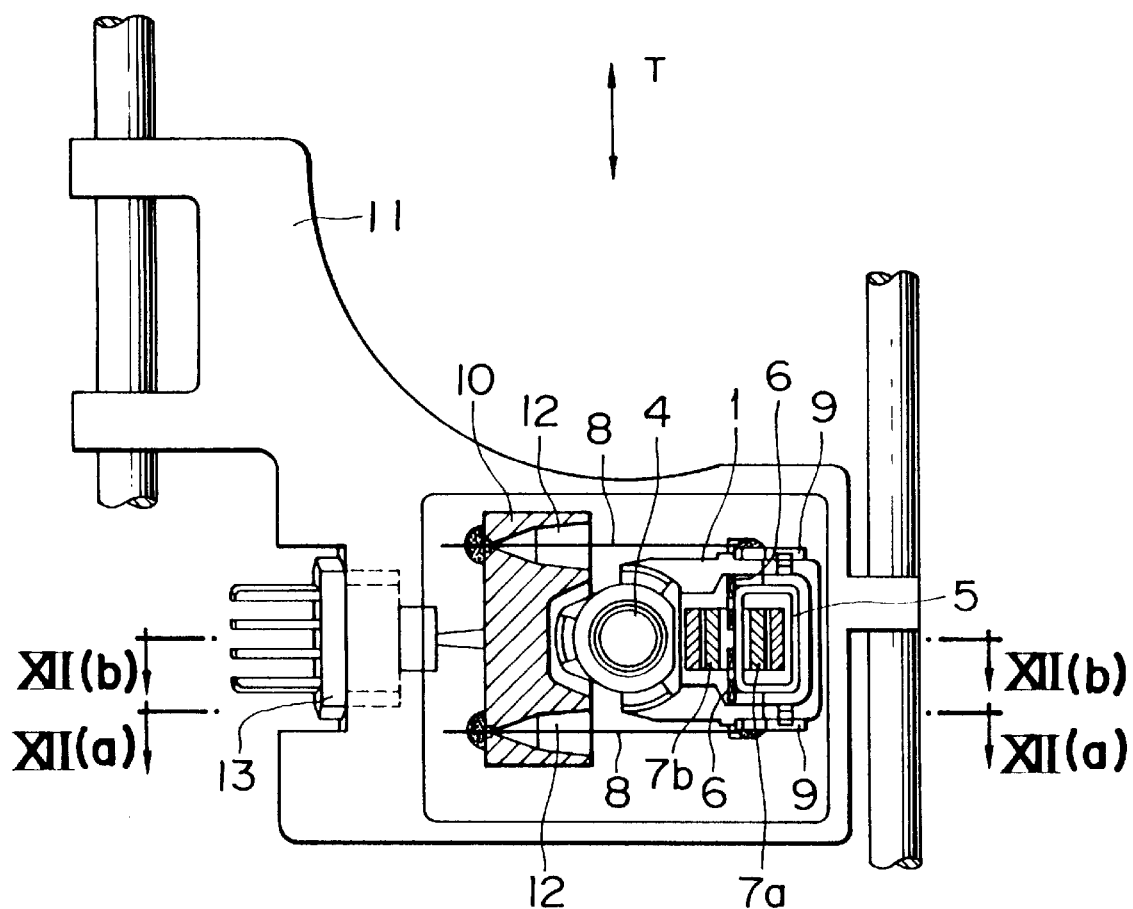
FIG. 11 is a plan view of a conventional optical pickup.
Figure 12A:
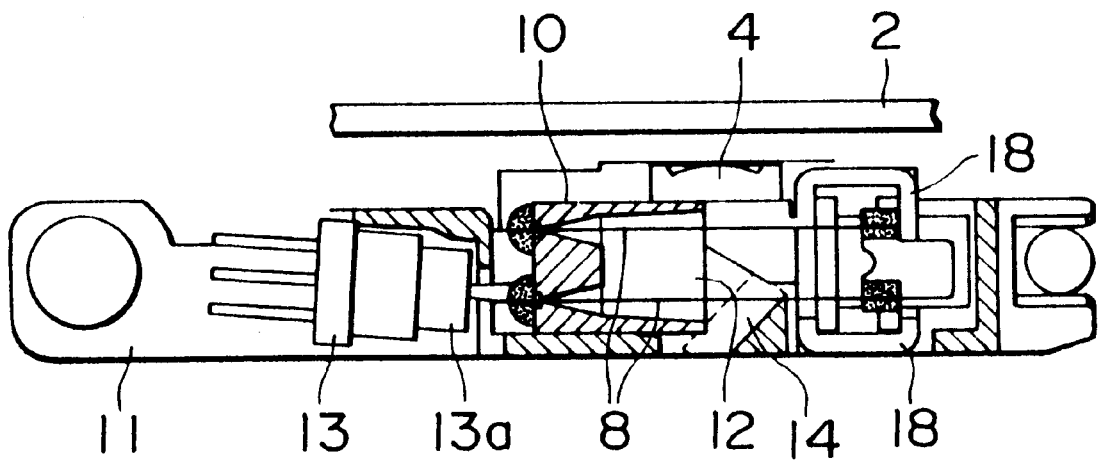
FIG. 12(*a*) is a sectional view of the optical pickup of FIG. 11 taken along line XII(*a*)—XII(*a*)
Figure 12B:
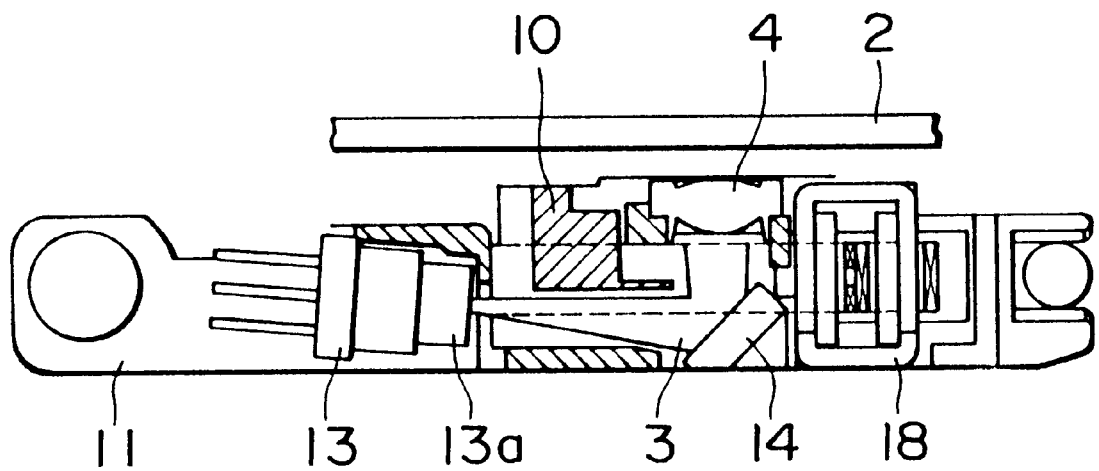
Figure 13A:
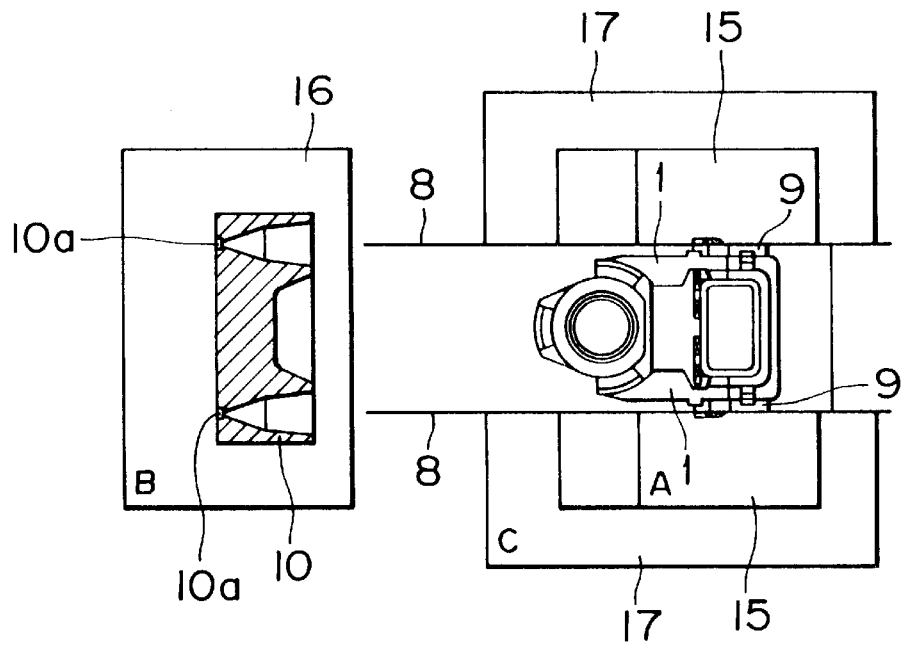
FIG. 13(*a*) is a plan view illustrating the step of connecting the junction board and the linear elastic members.
Figure 13B:
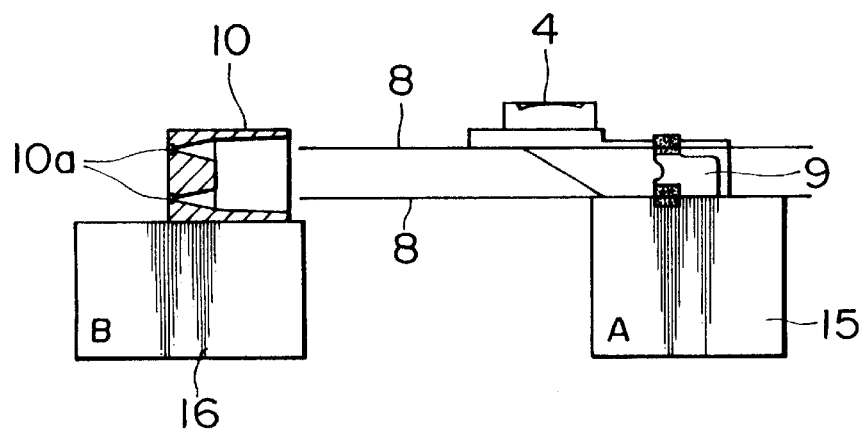
Figure 14A:
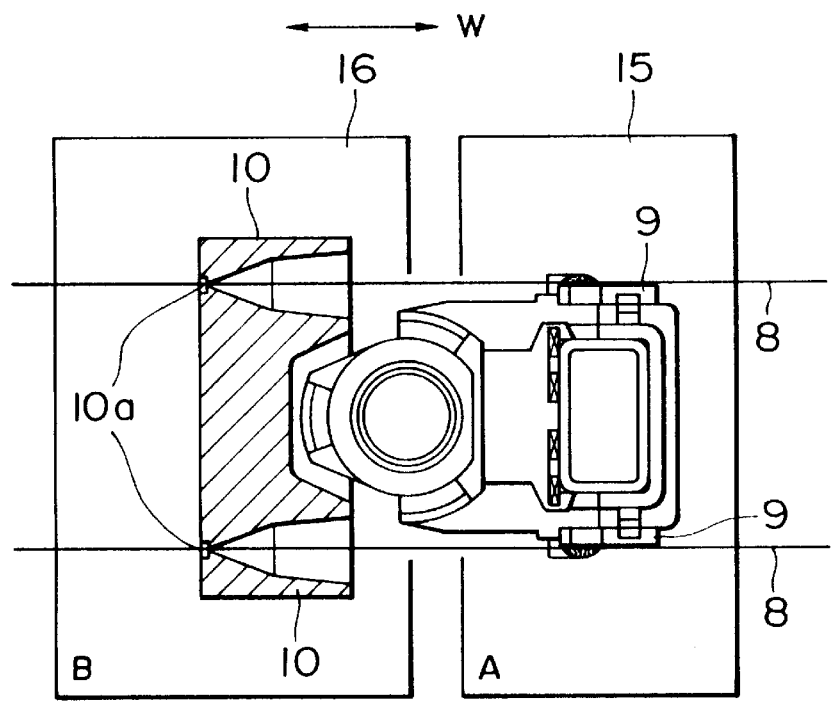
FIG. 14(*a*) is a plan view illustrating the step of combining the suspension holder and the linear elastic members.
Figure 14B:
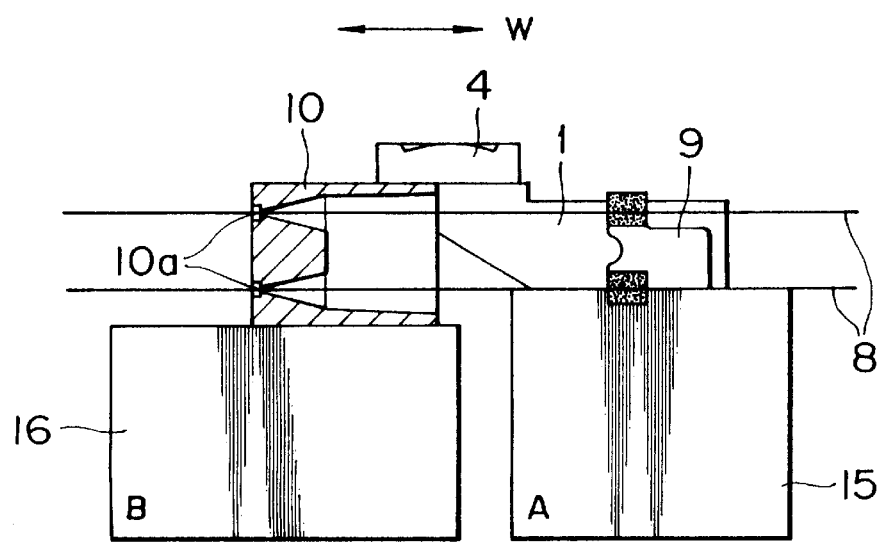
Figure 15A:
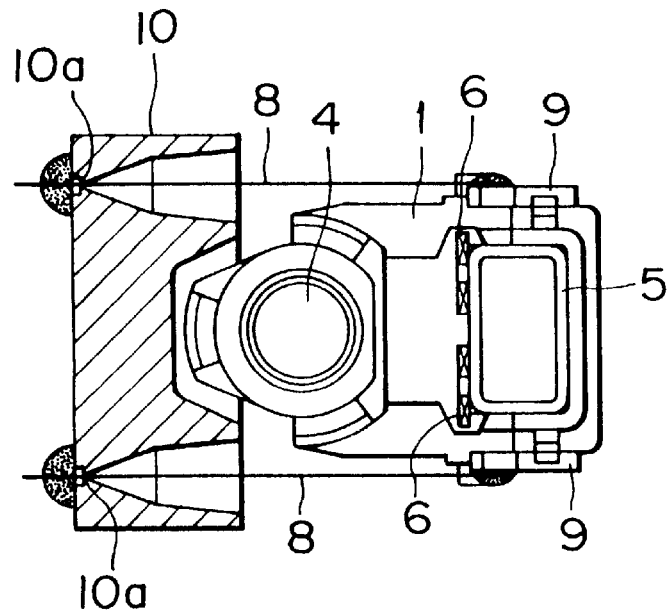
FIG. 15(*a*) is a plan view illustrating the step of completing the connection of the linear elastic members.
Figure 15B:
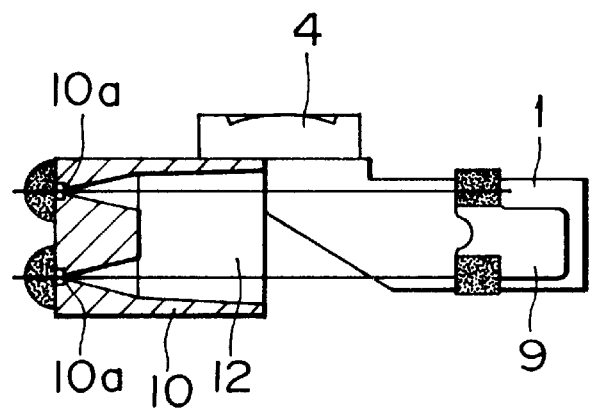

Now, a fourth embodiment is described for another assembly method of the optical pickup with reference to the drawings. FIG. 9 is a plan view illustrating another assembly method in which the bow stretch pins are mounted on a different jig; FIG. 10(a) is a front view illustrating the assembly method of FIG. 9; FIG. 10(b) is a side view of FIG. 10(a). The same components and members as in the conventional example and the first through third embodiments are designated by like reference numerals, and duplicated description is omitted.

As shown in FIGS. 9 and 10(a) and 10(b), the jig 25 shown in FIG. 3(a) is divided into a jig 30 supporting the suspension holder 22 and movable in the W direction, and jigs 31 supporting the bow stretch pins 29 and rotatable around the linear elastic members 21. Both jigs are mounted on separate movement mechanisms and rotation mechanisms.

First, as shown in FIGS. 9 and 10(a) and 10(b), the movable section (actuator) including the objective lens holder tube 1 is mounted on the jig 23, and the suspension holder 22 attached with the FPC (not shown) for power supply with adhesives or the like is mounted on the jig 30. In addition, the linear elastic members 21 are mounted on the jig 26 by means of air suction so that four linear elastic members 21 are parallel to each other.

In the initial stage of assembly, the jig 30 is retracted in the direction of W to a position where the suspension holder 22 does not come into contact with the linear elastic members 21. In addition, the jigs 31 are also retracted through rotation to positions where they do not come into contact with the linear elastic members 21.

Then, the jig 26 is moved to a predetermined position toward the actuator, and the linear elastic members 21 are soldered on the junction board 9 at four positions. Then, holding of the linear elastic members 21 is released from the jig 26.

Then, the jig 30 is moved in the W direction, and set at a predetermined position. At this time, the tips of the linear elastic members 21 at the suspension holder side pass side through the small holes 22a formed in the suspension holder 22.

At this time, the jigs 31 on which the bow stretch pins 29 are vertically mounted are rotated in the direction of θ and set at a predetermined position.

Then, the linear elastic members 21 are soldered in the bowed state to the suspension holder 22. Even if the linear elastic members 21 are released from the jigs 23 and 26, the bowed state of the linear elastic members 21 formed on the jigs is not returned to the parallel straight state, and maintained. In addition, the ratio of bowing (d/L) can be adjusted by adjusting the rotated position of the jigs 31.

All the bowing directions of the linear elastic members exemplified in the embodiments 1 through 4 are in a plane parallel to the plan view (in other word, in a plane parallel to the optical disc). This enables the objective lens to be placed in a space formed by bowing the elastic members, and reduces the thickness of the entire optical pickup unit in the direction perpendicular to the optical disc.

As described above, the feature of the present invention lies in that distortion stresses are internally generated because the linear elastic members are previously bowed to be bulged outward each other with respect to the objective lens, and that the combined natural frequency is eliminated because the distortion stresses are offset since the linear elastic members are oppositely bowed by twos each. Therefore, it is obvious that the present invention is not limited to the arrangements exemplified in the embodiments 1 through 4, and that same effects can be obtained from an arrangement in which the linear elastic members are bowed in a plane perpendicular to the plan view of FIG. 1 (in other words, in a plane perpendicular to the optical disc), or they are bowed in a plane inclined to the plane of the optical disc.

As described above, according to the optical pickup of the present invention, the linear elastic members arranged to be bowed outward each other are oppositely bowed each other, so that distortion stresses are offset. Accordingly, since the combined natural frequency in the pitching or yawing mode is eliminated, the objective lens (entire movable section) and the linear elastic members do not resonate with each other in fine tracking movement.

Thus, it becomes possible to provide an optical pickup which can be easily assembled, and does not cause vibration, a method for supporting the optical pickup, and a method for assembling the optical pickup.

What is claimed is:

1. A method for assembling an optical pickup, said optical pickup comprising lens holding means for holding an objective lens to converge a laser beam onto an optical disc and being movable in the tracking and focusing directions, a tracking coil and a focusing coil for driving said lens holding means in the tracking and focusing directions, a plurality of conductive linear elastic members supporting said lens holding means and supplying electric power to said tracking coil and said focusing coil, and a supporting and securing member for supporting and securing said linear elastic members, said method comprising:

a first securing step of securing one end of the linear elastic members on which no stresses are applied on lens holding means without applying stress;

a passing-through step of passing said linear elastic members through small holes drilled through the supporting and securing member;

a bowing step of bowing said linear elastic member; and a second securing step of securing said linear elastic members on which initial stresses are applied in said bowing step on said supporting and securing member in initial stressed condition.

2. A method as set forth in claim 1, wherein said first securing step includes securing said one end of the linear elastic members on which no stresses are applied in a free line state.

3. A jig for assembling an optical pickup, said optical pickup comprising lens holding means for holding an objective lens to converge a laser beam onto an optical disc and being movable in the tracking and focusing directions, a tracking coil and a focusing coil for driving said lens holding means in the tracking and focusing directions, a plurality of conductive linear elastic members supporting said lens holding means and supplying electric power to said tracking coil and said focusing coil, and a supporting and securing member for supporting and securing said linear elastic members, said assembling jig comprising:

first holding means for holding said lens holding means;

second holding means for holding said supporting and securing member, and on which bow stretch pins are vertically mounted with their centers outside said objective lens with respect to the center axes of said linear elastic members, and arranged to be movable parallel to said center axes; and third holding means disposed on each side of said first holding means, and for holding said linear elastic members in parallel with respect to the center of the optical pickup.

4. A jig for assembling an optical pickup as set forth in claim 3, wherein said bow stretch pin is vertically mounted on fourth holding means, said fourth holding means being provided separately from said second holding means, disposed on each side with respect to the center of said optical pickup, and arranged movable in a direction perpendicular to the center of said optical pickup.

5. A jig for assembling an optical pickup as set forth in claim 3, wherein said bow stretch pin is vertically mounted on fifth holding means, said fifth holding means being provided separately from said second holding means, disposed on each side with respect to the center of said optical pickup, and arranged rotatable on a plane in a direction perpendicular to the center of said optical pickup.

* * * * *